United States Patent
Bittlinger et al.

(10) Patent No.: US 11,140,892 B2
(45) Date of Patent: Oct. 12, 2021

(54) DEVICE FOR HOLDING A BAIT, IN PARTICULAR A BAIT FOR RODENTS

(71) Applicants: Wolfgang Bittlinger, Nuremberg (DE); Jürgen Buchstaller, Nuremberg (DE)

(72) Inventors: Wolfgang Bittlinger, Nuremberg (DE); Jürgen Buchstaller, Nuremberg (DE)

(*) Notice: Subject to any disclaimer, the term of this patent is extended or adjusted under 35 U.S.C. 154(b) by 879 days.

(21) Appl. No.: 15/509,089

(22) PCT Filed: Aug. 19, 2015

(86) PCT No.: PCT/EP2015/069066
§ 371 (c)(1),
(2) Date: Aug. 24, 2017

(87) PCT Pub. No.: WO2016/034419
PCT Pub. Date: Mar. 10, 2016

(65) Prior Publication Data
US 2017/0360024 A1    Dec. 21, 2017

(30) Foreign Application Priority Data
Sep. 5, 2014  (DE) .......................... 102014112804.4

(51) Int. Cl.
*A01M 25/00*        (2006.01)
(52) U.S. Cl.
CPC ........ *A01M 25/004* (2013.01); *A01M 25/002* (2013.01)
(58) Field of Classification Search
CPC ... A01M 25/00; A01M 25/002; A01M 25/004
(Continued)

(56) References Cited

U.S. PATENT DOCUMENTS

| 1,259,074 A | * | 3/1918 | Bealle | ................... | A01M 23/04 |
| | | | | | 43/69 |
| 1,381,464 A | * | 6/1921 | Frederic | ................ | A01M 23/00 |
| | | | | | 43/66 |

(Continued)

FOREIGN PATENT DOCUMENTS

| CA | 2973503 A1 | * | 7/2016 | .......... | A01M 25/004 |
| CA | 2984693 A1 | * | 10/2016 | ........... | A61B 5/0077 |

(Continued)

OTHER PUBLICATIONS

Translation of DE 928497 (Year: 1955).*

*Primary Examiner* — Darren W Ark
(74) *Attorney, Agent, or Firm* — Rimôn, P.C.

(57) ABSTRACT

The invention relates to a device (1) for mounting a lure (2), in particular a lure for rodents, comprising: —a housing part (3) that has at least one through-opening (9), in particular an axial through-opening, through which an access into an interior of the housing part is possible; and —at least one closing element (15) which has a main part and at least one lure receiving region, in particular on the main-part side, for receiving at least one lure (2), said closing element (15) being mounted in a movable manner relative to the housing part (3). The closing element (15) is moved away from the housing part (3) in an open position such that the at least one through-opening (9) is released and is moved towards the housing part (3) in a closed position such that the at least one through-opening (9) is closed.

19 Claims, 7 Drawing Sheets

Figure 1:
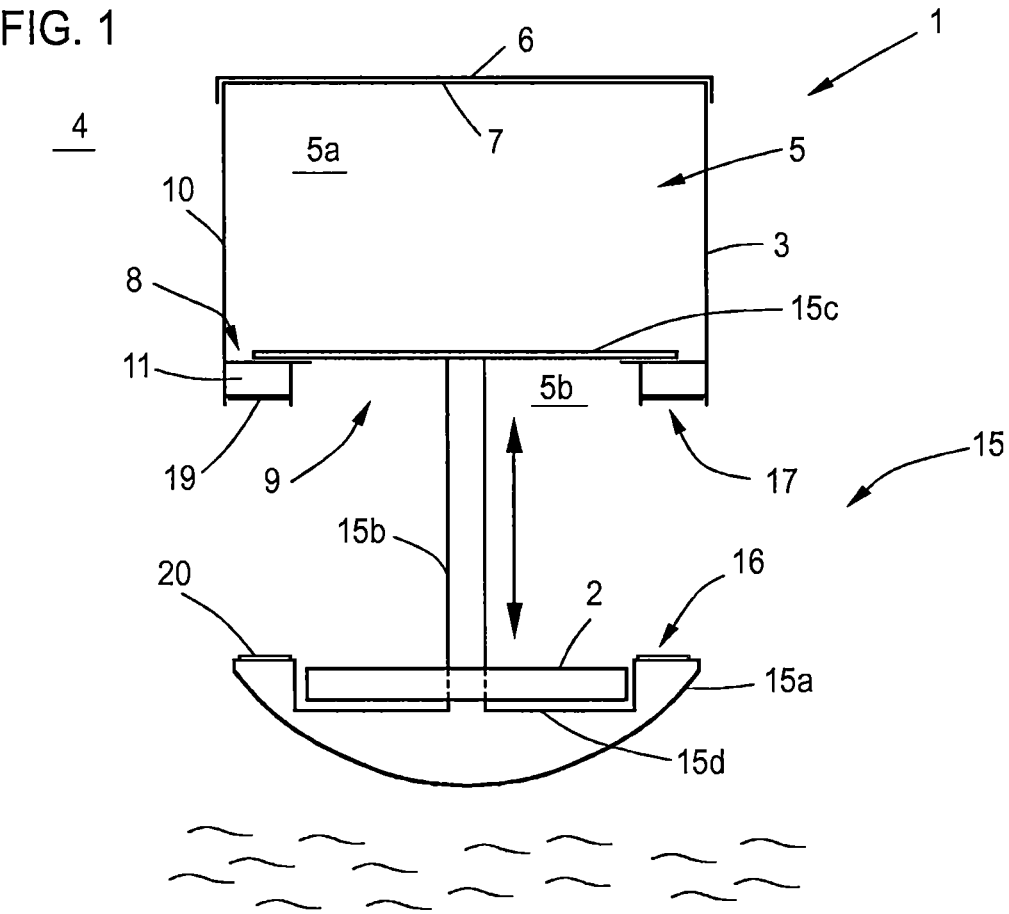

(58) Field of Classification Search
USPC ............ 43/131, 69; 119/51.04, 230; 222/51, 222/249, 464.6
See application file for complete search history.

(56) References Cited

U.S. PATENT DOCUMENTS

| | | | | |
|---|---|---|---|---|
| 1,494,853 A * | 5/1924 | Love | ................. | A01M 23/20 43/69 |
| 1,561,800 A * | 11/1925 | Savard | ................. | A01M 23/00 43/69 |
| 1,889,276 A * | 11/1932 | Dorrien | ................. | A01M 23/18 43/69 |
| 2,246,011 A * | 6/1941 | Russell | ................. | A01M 23/02 43/68 |
| 2,761,422 A * | 9/1956 | Martin | ................. | A01K 61/85 119/51.04 |
| 2,984,208 A * | 5/1961 | Kopietz | ................. | A01K 61/80 119/51.03 |
| 3,423,870 A * | 1/1969 | Kost | ................. | A01M 23/04 43/69 |
| 3,487,433 A * | 12/1969 | Fleming | ................. | A01K 61/80 119/51.04 |
| 3,643,632 A * | 2/1972 | Poirot | ................. | A01K 61/80 119/54 |
| 3,677,230 A * | 7/1972 | Braden | ................. | A01K 61/80 119/51.04 |
| 3,688,743 A * | 9/1972 | Josef Rack | ................. | A01K 61/80 119/51.04 |
| 4,051,620 A * | 10/1977 | Yasuda | ................. | A01K 93/00 43/44.99 |
| 4,270,489 A * | 6/1981 | Joronen | ................. | A01K 61/85 119/51.04 |
| 4,388,775 A * | 6/1983 | Wright | ................. | A01M 23/04 43/69 |
| 5,979,105 A * | 11/1999 | Marks | ................. | A01M 23/02 43/61 |
| 8,336,251 B2 * | 12/2012 | Orchard | ................. | A01M 31/002 43/60 |
| 8,341,875 B2 * | 1/2013 | Van Dyke | ................. | A01K 69/06 43/107 |
| 8,745,917 B2 * | 6/2014 | Hui | ................. | A01M 1/103 43/107 |
| 10,226,039 B2 * | 3/2019 | Buchstaller | ................. | A01M 25/004 |
| 10,357,027 B2 * | 7/2019 | Othon | ................. | A01M 25/004 |
| 11,013,227 B2 * | 5/2021 | Buchstaller | ................. | A01M 25/004 |
| 2006/0123693 A1 * | 6/2006 | Muller | ................. | A01M 23/12 43/99 |
| 2009/0025274 A1 * | 1/2009 | Lail | ................. | A01M 23/08 43/67 |
| 2018/0007889 A1 * | 1/2018 | Bittlinger | ................. | A01M 25/004 |
| 2018/0132475 A1 * | 5/2018 | Bittlinger | ................. | A01M 1/2011 |

FOREIGN PATENT DOCUMENTS

| | | | | |
|---|---|---|---|---|
| CA | 3022366 A1 * | 12/2017 | ........... | A01M 25/004 |
| DE | 928497 B | 6/1955 | | |
| DE | 3140658 A1 | 4/1983 | | |
| DE | 19634536 A1 | 3/1998 | | |
| DE | 29819988 U1 | 6/1999 | | |
| DE | 19954142 C2 | 3/2002 | | |
| FR | 2032164 A5 * | 11/1970 | ........... | A01N 25/004 |
| FR | 2516747 A1 * | 5/1983 | ........... | A01M 25/004 |
| FR | 2516747 A1 | 5/1983 | | |
| GB | 2071984 A * | 9/1981 | ........... | A01M 25/004 |
| GB | 2230930 A | 11/1990 | | |
| GB | 2293956 A | 4/1996 | | |
| WO | WO-2016116079 A1 * | 7/2016 | ........... | A01M 25/004 |
| WO | WO-2016166011 A1 * | 10/2016 | ........... | A61B 5/0077 |
| WO | WO-2017207479 A1 * | 12/2017 | ........... | A01M 31/002 |

* cited by examiner

DEVICE FOR HOLDING A BAIT, IN PARTICULAR A BAIT FOR RODENTS

CROSS-REFERENCE TO RELATED APPLICATIONS

This application is a United States national stage entry of an International Application serial no. PCT/EP2015/069066 filed Aug. 19, 2015 which claims priority to German Patent Application Ser. No. 10,2014/112,804.4 filed Sep. 5, 2014. The contents of these applications are incorporated herein by reference in their entirety as if set forth verbatim.

The invention relates to a device for mounting a lure, in particular a lure for rodents.

Devices of this type are provided for pest control, that is to say in particular for controlling rodents such as mice and rats, for example, that are native to sewers or lines that are perfused by water, that is to say in particular waste water, rain water or effluent sewers and/or cable ducts, or corresponding sewer and line shafts, respectively, and can cause considerable damage therein, for example to systems and installations for waste-water technology or to other infrastructure systems and installations, respectively. Respective devices therefore typically mount pest-specific lures which contain particular toxins or active ingredients, respectively, which in various ways lead to the pests expiring and/or prevent the pests reproducing.

The toxins or active ingredients, respectively, which are contained in the lures typically represent a potential danger to humans and to nature such that attention has to be paid to respective lures not making their way into the ground water and contaminating the latter. This possibility does exist in the case of conventional devices in the case of large amounts of water or high water levels, respectively, for example in sewers and sewer ducts, respectively, this being the case in particular after heavy rain.

The invention is therefore based on the object of stating an improved device for mounting a lure, in particular a lure for rodents.

The object is achieved by a device of the type mentioned at the outset, said device according to the invention being distinguished by:
- a housing part, wherein the housing part has at least one in particular axial through opening through which access into an interior space in the housing part is possible,
- at least one closing body which has a main body and at least one lure-receiving region in particular in the main body for receiving at least one lure, wherein the closing body is supported so as to be movable relative to the housing part, wherein the closing body in an open position is moved away from the housing part in such a manner that the at least one through opening is exposed, and in a shut position is moved against the housing part in such a manner that the at least one through opening is closed off.

The concept according to the invention related to a device of a particular configuration for mounting a lure for pests, that is to say in particular a lure for rodents such as mice and rats, for example. The lure contains specific and typically pest-specific substances such as, for example, toxins or active ingredients, respectively, which in various ways lead to the pests expiring and/or prevent the pests reproducing. The term pest will be singularly used hereunder. Pests are understood to be in particular rodents such as mice and rats, for example.

The device according to the invention comprises a housing part. The housing part is disposable or is disposed generally at or in an environment in which the former can come into contact with water, in particular rain water, but also with industrial waste water, combined water, surface water, etc. and/or other liquid media. In principle, the housing part is disposable or is disposed in such locations where the possibility of a contamination of water and/or other liquid media by the substances that are contained in the lure that is mounted in the device is conceivable. This applies in particular to locations where water or liquid media, respectively, are present in principle, or where water or liquid media, respectively, can accumulate.

The housing part can thus be disposable or be disposed for example at or in specific structures or parts of structures, respectively, or buildings or parts of buildings, respectively, in civil engineering sectors above and below ground such as, for example, overpasses or underpasses, garages, basements, tank farms, silos, etc. Of course, the housing part can also be disposable or be disposed at any other dispositions which can come into contact with water, in particular rain water, such as, for example, waste containers, cultivation projects, that is to say trees, for example, stockades, in particular walls or fences, stops for public or private transportation means, phone boxes, street lighting, distribution or utility boxes, respectively.

As a specific example, the housing part for example can be disposable in or insertable into, respectively, a sewer or a sewer shaft such as a waste water sewer shaft and/or a cable duct shaft. Water or waste water, respectively, is typically present in the sewer or sewer shaft, respectively, or the sewer or sewer shaft, respectively, can at least at times be perfused by water or waste water, respectively. The term sewer shaft will be singularly used hereunder. A sewer shaft is to be understood to be part of a water-conducting installation, such as of a sewer system for water, for example, that is to say waste water, rain water, effluent water, for example, or a duct system for utility lines etc.

In order for a stable and secure arrangement of the housing part to be implemented, the latter expediently has fastening means by way of which said housing part is in particular releasably fastenable to a third-party object, such as to a wall of a sewer shaft, for example, or to a climbing installation on the sewer shaft, such as a step iron on the sewer shaft, for example. The one or more fastening means can be configured so as to be hook-shaped, for example, in order for the housing part and thus the entire device to be anchored to the third party object, that is to say to a wall of the sewer shaft, for example, or to respective corresponding climbing installations. Alternatively or additionally, the housing part can of course also be disposed on, that is to say fastened to, a subsoil.

Of course, the device or the housing part, respectively, can also be disposable or be disposed on or in transportation or transit means, respectively, such as ships, for example.

The housing part is typically formed from a corrosion-resistant material such as, for example, a stainless steel (sheet) and/or plastics. Different portions of the housing part can be formed from different materials. It applies in particular to the embodiment of the or a portion of the housing part from plastics that a transparent plastic material can be used here in order to permit a view of the interior of the housing part as required for example for the purpose of checking for lure-biting.

The housing part is configured in particular so as to be hollow-cylindrical, that is to say that the interior of said housing part forms a cylindrical interior space which can serve as the receptacle space for specific components of the device, or in which specific components of the device are receivable or are received.

The housing part, for example at an end side, can be capable of being closed or be closed by way of a lid element such that potential access to the interior of the housing part, that is to say the interior space in the housing part, can be achieved by removing the lid element. The lid element can have a threaded portion, while the housing part can have a threaded portion that is complementary to the former, such that the lid element can be screw-fitted to the housing part.

The housing part has at least one through opening through which access to the interior of the housing part, or to the interior space in the housing part, respectively, is possible. The through opening defines a lower region of the housing part that lies below said through opening, and an upper region of the housing part that lies above said through opening.

The device according to the invention furthermore comprises a closing body. The closing body comprises a main body and at least one lure-receiving region in particular on the main body for receiving at least one lure. The lure-receiving region thus serves as a storage location for storing at least one lure. A pest, in order to reach the lure, thus must make its way to or onto the closing body, respectively, in particular to or onto the main body in the closing body, respectively. As will yet be derived from the narrative hereunder, this is typically possible only when the closing body is in an open position.

The lure-receiving region can be formed by at least one depressed portion of the main body of the closing body, for example. Assuming an exemplary case of a rotationally symmetrical geometry of the closing body, in particular of the main body, the lure-receiving region can be a depression in the shape of an annular disk or of a disk, for example. In principle, the dimensions, that is to say in particular the shape, of the depression that forms the lure-receiving region can be adapted to the dimensions, that is to say in particular the shape, of a lure that is to be received in the lure-receiving region, such that a receptacle for the lure that is stable in terms of location and position, respectively, results. Of course, the lure-receiving region can have a plurality of compartments which each serve for receiving one lure. In turn, the dimensions, that is to say in particular the shape, of the compartments can be adapted to the dimensions, that is to say in particular the shape, of a lure to be received in the respective compartments. A plurality of separate or interconnected, that is to say mutually transitioning, depressions can be provided.

Of course, it is possible in principle for the lure to also be disposed on a main body that is not provided with a depression that forms a lure-receiving region. The lure can be arranged loose or fastened to the main body. Fastening of the lure to or on the main body, respectively, can be established by adhesive bonding, for example.

In terms of the constructive design embodiment of closing body it is possible for the main body of the closing body to comprise a support portion for supporting the closing body on the housing part, said support portion being spaced apart from said main body and connected thereto by way of at least one connection web. The support portion is thus connected to the main body by way of the connection web. This connection can be releasable, that is to say that both the main body as well as the support portion can be releasably connected to the connection web, for example by way of form-fitting and/or force-fitting connection types such as clamping, latching, or plug-fitting connections, for example.

Of course, it is also conceivable for the closing body to be configured in an integral or monolithic manner, respectively.

The closing body can be supported or mounted, respectively, on the housing part by way of the support portion. Supporting or mounting of the closing body on the housing part herein is typically performed by hooking the support portion into the interior space in the housing part. The support portion herein engages across respective peripheries or wall elements, respectively, on the housing part that radially delimit the through opening.

Supporting or mounting, respectively, of the closing body is typically releasable, that is to say that the closing body can be removed from the housing part on demand and can again be supported or mounted, respectively, thereon on demand. A simple capability of the device in terms of assembly or disassembly, respectively, results therefrom, which is expedient with a view to service and/or repair jobs, for example. Accordingly, the support portion is advantageously dimensioned such that the latter by way of tilting movements of the closing body, or by tilting the latter, respectively, relative to the housing part is movable through the through opening in the housing part.

The support portion can furthermore be provided with at least one securing contour, and the housing part can be provided with at least one counter-securing contour that is configured so as to be complementary to said securing contour. The securing contour on the support portion and the counter-securing contour on the housing part in the shut position of the closing body interact in such a manner that the closing body is securely supported in relation to the radial displacement movements relative to the central axis of the housing part. Herein, the securing contour on the support portion in the shut position of the closing body typically engages in a form-fitting manner in the counter-securing contour on the housing part, or vice versa.

In constructive terms, this can be implemented in such a manner, for example, that the at least one, or at least one, securing contour on the support portion is formed by an in particular dome-shaped or wedge-shaped protrusion that in relation to the central axis of the closing body protrudes axially from the support portion, and the at least one, or at least one, counter-securing contour on the housing part is formed by an in particular dome-shaped or wedge-shaped convexity or clearance. It is also conceivable for the at least one, or at least one, securing contour on the support portion to be formed by an in particular dome-shaped or wedge-shaped convexity or clearance, and for the at least one, or at least one, counter-securing contour on the housing part to be formed by an in particular dome-shaped or wedge-shaped protrusion that in relation to the central axis of the housing part protrudes axially from the housing part. An in particular form-fitting mutual engagement of respective securing contours and counter-securing contours is possible in all cases, this resulting in the mentioned effect of a displacement-resistant support of the closing body in the shut position that is secured against radial displacement movements.

The closing body is supported so as to be movable relative to the housing part. The closing body herein can be moved relative to the housing part between an open position and a shut position, and optionally vice versa. The support of the closing body typically includes an arrangement of the closing body on the housing part or a connection of said closing body to said housing part, respectively, that is captive but nevertheless capable of being cancelled or released, respectively, on demand.

The closing body in the open position is moved away from the housing part in such a manner that the at least one through opening in the housing part is exposed. Consequently, potential access to the interior space in the housing part is provided in the open position of the closing body. Accordingly, a pest can pass the through opening in the open position of the closing body, or the former can make its way into the interior space in the housing part, respectively.

The closing body in the shut position is moved against the housing part in such a manner that the at least one through opening is closed off. Consequently, there is no potential access to the interior space in the housing part in the shut position of the closing body. Accordingly, a pest cannot pass the through opening in the shut position of the closing body, or the former cannot make its way into the interior space in the housing part, respectively.

In terms of the concept according to the invention it is essential herein that ingress of water, caused for example by flooding or gushing water, into the housing part, that is to say into the interior space in the housing part, is not possible in the shut position of the closing body. In the shut position of the closing body, the lure that is received in the lure-receiving region is enclosed, typically in a hermetically sealed manner, between the main body and the housing part. In particular, the lure that is received in the lure-receiving region in the shut position of the closing body is disposed within the interior space in the housing part, that is to say in particular within the lower region of the interior space in the housing part. In this manner a concept which counteracts the issue of the contamination of water by substances, that is to say toxins or active ingredients, respectively, that are contained in respective lures is provided.

The movement of the closing body from the shut position to the open position can be initiated or implemented, respectively, in various ways. This will be discussed in more detail later.

It is conceivable for a lure platform to be disposed or configured, respectively, within the housing part. To the extent that the lure platform is available, the latter can (conjointly) delimit the at least one through opening. It is conceivable for an additional lure to be disposed directly on the lure platform. Alternatively or additionally, an additional lure can also be disposed so as to be mounted on a lure-holding installation on the housing part for mounting an additional lure. Accordingly, such a lure-holding installation is typically disposed above the lure platform. The rule applies that at least one additional lure can be disposed in the upper region of the housing part.

In order to reach the additional lure that, as has been mentioned, is typically disposed in the upper region of the housing part, a pest first has to make its way into the housing part. To this end, the housing part is expediently configured having at least one passage by way of the which the pest can make its way into the housing part and/or out of the housing part. Alternatively or additionally, a respective passage can also be configured on the closing body. The passage enables access to the lower region of the housing part.

In order to reach the additional lure, the pest that has made its way into the housing part must furthermore make its way through the through opening that is delimited by the lure platform to the lure platform and thus into the upper region of the housing part. After biting the additional lure, by passing the through opening the pest can make its way from the upper region of the housing part into the lower region of the housing part and by way of respective passages leave the device. Of course, it is also conceivable in principle for the or a further passage to enable access to the upper region of the housing part.

The closing body can be supported so as to be reversibly movable between the open position and the shut position. Consequently, the closing body that is in the shut position can transfer in a self-acting manner back to the open position and vice versa. Alternatively, the closing body can be supported so as to be irreversibly movable between the open position and the shut position in such a manner that said closing body in the shut position is capable of being mounted or is mounted, in particular in a releasable manner, by way of at least one closing body holding installation. The closing body can thus be mounted in the shut position by way of the closing body holding installation. The closing body that is in the shut position here thus cannot transfer back to the open position in a self-acting manner.

The closing body holding installation on the housing part and/or closing body can comprise at least one mechanical and/or magnetic holding means which is adapted for mechanically and/or magnetically mounting the closing body in the shut position. The mechanical or magnetic holding means, respectively, on the housing part or closing body, respectively, thus can interact in such a manner that the closing body is securely mounted in the shut position and cannot be readily released from the latter.

The or a mechanical holding means can comprise latching or snap-fitting elements, respectively, which implement mechanical mounting of the closing body in the shut position. The latching or snap-fitting elements, respectively, can be for example protrusions and clearances or undercuts that correspond to the former, respectively. Depending on the design of the latching or snap-fitting elements, respectively, in terms of construction, the mounting that is implemented by way of said elements can be releasable or non-releasable.

The or a magnetic holding means can comprise in particular permanently magnetic elements, for example, which by virtue of a magnetic interaction implement a magnetic mounting of the closing body in the shut position. For example, it is conceivable in this context for example for a magnetic element on the housing part to be disposed in such a manner that the former exerts a magnetic force on a magnetic element on the closing body that mounts the closing body in the shut position when the closing body approaches the shut position or is in the shut position, respectively. The magnetic force should not be so high that the closing body that is in the open position is moved to the shut position by virtue of said magnetic force alone. To the extent that the closing body is made from a material that is magnetic or is magnetizable, or comprises such a material, magnetic elements on the closing body can optionally be dispensed with. In principle, the housing part and/or the closing body can comprise respective magnetic elements.

The support of the closing body that is movable relative to the housing part in terms of construction can be implemented by at least one guide portion on the housing part and at least one guide element on the closing body, wherein the at least one guide portion on the housing part and the at least one guide element on the closing body interact while configuring a guide of the closing body that is supported so as to be movable between the open position and the shut position, and vice versa. In general, linear guidance of the closing body is typically enabled by the interaction of the guide portion(s) on the housing part with the guide element(s) on the closing body. A guide portion on the housing part can be configured on an external or internal side of the housing part. A guide element on the closing body can be configured as a guide rail or guide web, for example, while a guide portion on the housing part can for example be configured as a guide rail receptacle or guide web receptacle, respectively.

In terms of the constructive design embodiment of the closing body, it is preferable that the latter has at least one closing portion that is planar or dome-shaped or cone-shaped, for example, and in the shut position of the closing body in portions bears in a sealing manner on bearing portions on the housing part. Ingress of water which is located in the sewer shaft that receives the device into the housing part, that is to say in particular into the upper region of the interior space in the housing part is not possible on account of the closing body, that is to say of respective counter-bearing portions that are configured on the closing portion on the closing body, bearing in a sealing manner on respective bearing portions on the housing part.

The bearing portions on the housing part are expediently provided at least in portions with a sealing element such as an annular seal, a lip seal, etc., for example. Likewise, the closing portion on the closing body, that is to say in particular respective counter-bearing portions that are configured on said closing portion, can be provided at least in portions with a sealing element such as an annular seal, a lip seal, etc., for example.

Exemplary embodiments of the device will be described in the following, by means of which it will be explained in more detail how a movement of the closing body from the open position to the shut position and vice versa can be initiated. The embodiments that will be described hereunder in this context can be combined in any arbitrary manner.

Herein, one embodiment provides that the main body of the closing body is configured as a float or comprises at least one float. A float is understood to be a solid body which floats on a water surface and does not sink. In constructive terms, this can be implemented by way of a main body that has at least one cavity for example. The cavity is filled with air, for example. Alternatively or additionally, at least the main body of the closing body can be made from a material of lesser density which thus by virtue of the density differential floats on a water surface and does not sink. Such a material can be plastics, for example, in particular foamed plastics. Specifically, these can thus be foamed thermoplastics, for example, such a foamed polyethylene or foamed polystyrene (styrofoam), for example. A movement of the closing body from the open position to the shut position would in this instance be initiated automatically by an increase in the water level, for example in a sewer shaft that receives the device. Accordingly, a movement of the closing body from the shut position to the open position would be initiated by a drop in the water level, for example in the sewer shaft that receives the device.

One further embodiment provides that the movement of the closing body from the open position to the shut position is initiated by a drive installation that is capable of being coupled or is coupled to the closing body. The drive installation is adapted for moving the closing body from the open position to the shut position and/or vice versa. In terms of the configuration or conception, respectively, of such a drive installation, two fundamentally different embodiments which however are capable of being combined with one another are imaginable.

A first embodiment of a drive installation provides that the drive installation is configured as a motorized drive installation or comprises at least one of the latter. Consequently, at least one motorized drive installation that is coupled to the closing body and is adapted for moving the closing body from the open position to the shut position and/or vice versa can be provided. The motorized drive installation can be an electric motor, for example. The coupling of the motorized drive installation to the closing body can be implemented by suitable traction means, for example, such as in the form of belts, chains, webs, etc. Of course, the main body of the closing body in this embodiment can also be configured as a float or comprise at least one float.

A second embodiment of a drive installation provides that the drive installation is configured as a magnetic drive installation or comprises at least one of the latter. Consequently, at least one magnetic drive installation that is coupled to the closing body, or is capable of being coupled thereto, and is adapted for moving the closing body from the open position to the shut position and/or vice versa can be provided. The closing body in this embodiment can also be configured as a float or comprise at least one float.

The magnetic drive installation on the housing part and on the closing body typically comprises at least one magnetic element that is capable of being magnetized and/or is magnetic. Both electromagnetic as well as permanently magnetic elements are to be considered. A magnetic element that is capable of being magnetized can thus be an electromagnet, for example, which when energized exerts a magnetic force of attraction. A magnetic element can be a permanent magnet, for example, which has a static magnetic field. The magnetic elements on the housing part and on the closing body can in each case interact with each other in such a manner that a high magnetic force of attraction by virtue of which the closing body can be moved from the shut position to the open position is capable of being exerted.

Various configurations are conceivable in this context. For example, it is possible herein that at least one electromagnetic element which can be energized on demand is disposed on the housing part, and when energized interacts with at least one permanently magnetic element on the closing body in such a manner that the closing body by virtue of magnetic attraction can be moved from the open position to the shut position. Herein, the or a magnetic element on the closing body can be disposed on an exposed surface of the closing body or integrated in the closing body. Of course, the closing body per se can be made from a material that is magnetic or is capable of being magnetized, such as a ferritic steel, for example, or a plastic that is filled with particles that are magnetic or are capable of being magnetized.

However, in principle it is also possible for at least one electromagnetic element on the closing body and at least one permanently magnetic element on the housing part to be provided.

Likewise, respective electromagnetic elements can be provided both on the housing part as well as on the closing body.

It is also conceivable for a permanently magnetic element to be provided both on the housing part as well as on the closing body such that upon a sufficient approach of the magnetic element on the closing body to the magnetic element on the housing part the closing body by virtue of magnetic attraction is moved from the open position to the shut position. The sufficient approach can be achieved for example when a closing body having a main body that is configured as a float or comprises at least one float, for example due to flooding, proceeding from the open position is moved by a specific amount in the direction of the lure platform that is to say to a position that is between the open position and the shut position. Of course, in this embodiment attention has to be paid to the magnetic attraction or interaction, respectively, that exists between the respective permanently magnetic elements to ensure it is not so high that the closing body that is in the open position is not moved to the shut position by virtue of said magnetic attraction alone.

In terms of the embodiments of a motorized and/or an electromagnetic drive installation as described, it is conceivable that an assigned controller installation by way of which controlling of the operation of the drive installation(s) is performed is provided. The controller installation is thus adapted for generating items of control information that control the operation of the motorized and/or electromagnetic drive installation(s).

The controller installation can furthermore be adapted for generating the items of control information depending on an item of water-level information that describes the or a water level in the environment that receives the device and is supplied by a water-level detection installation for detecting the water level in an environment that receives the device, for example in a sewer shaft. Consequently, controlling the operation of the motorized and/or electromagnetic drive installation can be performed so as to depend on a water level in the environment that receives the device, that is detected by way of a respective water-level detection installation and is mirrored in a respective item of water-level information. On the controller-installation side, specific critical water levels at which, when said water levels are reached, ingress of water into the housing part, that is to say in particular into the upper region of the housing part or into the interior space in the housing part, respectively, is possible in principle can be considered such that the controller installation supplies respective items of control information to the motorized and/or electromagnetic drive installation in a timely manner so as to prevent ingress of water into the housing part or into the interior space in the housing part, respectively.

The water-level detection installation can form part of the device. However, this is not mandatory; the controller installation can rather also be adapted for communicating with at least one external water-level detection installation, that is to say that the latter is separated from the device in spatial terms. This herein can be in particular a water-level detection installation that in relation to the position of the device is disposed so as to be spatially separated from the latter, that is to say is located upstream in a sewer shaft, for example, such that a looming high water level can be detected in a timely manner. Of course, the device or the controller installation, respectively, has receiver installations that are suitable therefor and enable in particular a wireless exchange of data or items of information, that is to say implemented by way of Bluetooth, WLAN, etc., for example, with a water-level detection installation.

The device can furthermore comprise a shut-position detection installation for detecting the shut position of the closing body. The shut-position detection installation that is typically disposed in the housing part upon detection of the shut position of the closing body is adapted for generating at least one of an acoustic and/or optical item of closed-position information and for outputting the latter by way of at least one output means. It is enabled in this manner for the achievement of the shut position to be detected and to be indicated in a simple manner by way of acoustic and/or optical signals, which can be expedient in the case of service and or repair jobs. It can thus be indicated to the service or repair personnel that a high water level is being or has been reached in a sewer, for example, the closing body by virtue of said high water level having been moved to the shut position or being furthermore mounted in the shut position. Consequently, the shut-position detection installation comprises a suitable sensor system for detecting the shut position of the closing body. The sensor system can be embodied in an optical manner, that is to say by way of the implementation of light barriers, for example.

The device can furthermore comprise a bite-detection installation for the detection of lure-biting. The bite-detection installation that is typically disposed in the housing part upon detection of a bitten lure is adapted for generating at least one of an acoustic and/or optical item of bite information and for outputting the latter by way of at least one output means. In this manner the detection of a bitten lure and the indication of the latter by way of acoustic and/or optical signals is enabled in a simple way, this in turn being potentially expedient in the case of service or repair jobs. It can thus be indicated to the service or repair personnel that lure-biting has occurred and thus that a check in terms of whether a new lure is required is provided. Accordingly, the bite-detection installation comprises a suitable sensor system for detecting a bitten lure. The sensor system can detect the weight of the lure that is received in the lure-receiving region, for example, wherein variations in weight of the lure due to lure-biting, typically weight losses, permit conclusions to be drawn in terms of a bitten lure. The sensor system can likewise detect forces due to lure-biting that act on the lure and/or on the closing body, typically tensile forces, which likewise permit conclusions to be drawn in terms of a bitten lure.

As has been mentioned, an additional lure can be disposable or be disposed on a lure-holding installation for mounting a lure. In the case of the device being equipped with such a lure-holding installation, it can be likewise expedient for the device to furthermore comprise a further bite-detection installation for the detection of lure-biting of the additional lure. Accordingly, the further bite-detection installation that is typically disposed in the housing part upon detection of a bitten additional lure is adapted for generating at least one of an acoustic and/or optical item of bite information and for outputting the latter by way of at least one output means. In this manner the detection of an additional lure that has been bitten by a pest and the indication of the latter by way of acoustic and/or optical signals is enabled in a simple way, this in turn being potentially expedient in the case of service or repair jobs. It can thus be indicated to the service or repair personnel that lure-biting has occurred on an additional lure and thus that a check in terms of whether a new additional lure is required is provided. Accordingly, the further bite-detection installation comprises a suitable sensor system for detecting a bitten additional lure. The sensor system can detect the weight of the additional lure that is received in the lure-receiving region, for example, wherein variations in weight of the additional lure due to lure-biting, typically weight losses, permit conclusions to be drawn in terms of a bitten additional lure. The sensor system can likewise detect forces due to lure-biting that act on the additional lure and/or on the lure-holding installation, typically tensile forces, which likewise permit conclusions to be drawn in terms of a bitten additional lure.

Depending on the lure-biting information, for example based on the detection of the weight of the lure or of the additional lure, respectively, a bite-detection installation can generate different acoustic and/or optical signals. The weight of a new and not yet bitten lure can be signaled by way of optical signals of green color and/or by way of optical signals that are output in a permanent, constant manner, for example; the weight of a partially bitten lure can be signaled by way of optical signals of yellow color and/or by way of optical signals that are output at a first flashing frequency, for example; should the lure have been completely devoured, this can be signaled by optical signals of red color and/or by way of optical signals that in comparison to the first flashing frequency are output at a higher second flashing frequency, for example.

Of course, the same applies to the output of acoustic signals, wherein the frequency and/or the rhythm of a tone or of a sequence of tones, respectively, are/is in particular variable so as to depend on the lure-biting information, for example based on the detection of the weight of the lure. This applies in an analogous manner to the case in which the bite-detection installation draws conclusions in terms of a bitten lure not by way of the weight but by way of other measured values.

An acoustic output means can be configured as a loudspeaker, for example, or comprise at least one of the latter. An optical output means can be configured as an in particular multi-colored light emitting diode or a display screen, or comprise at least one of the two former.

The or an output means can be disposed on or in the housing part, wherein said output means is disposed on an exposed external face of the housing part or within the interior space in the housing part. It applies in particular to optical output means that to the extent that the latter are disposed within the housing part, that is to say within an interior space in the housing part, the housing part should be configured so as to be at least partly partially transparent in order for the optical signals to be rendered identifiable also from outside the housing part.

The or an output means can also be integrated in an external mobile terminal apparatus. To the extent that the or an output means is integrated in an external mobile terminal apparatus, the shut-position detection installation and/or the bite-detection installation can be adapted for communicating with the external mobile terminal apparatus and for transmitting the shut-position information and/or the bite-detection information to the external mobile terminal apparatus for output by the output means on the latter. In this manner, service or operating personnel can be informed about the shut position of the closing body having been reached and/or about a lure having been bitten, even without entering a sewerage, for example. The communication described is implemented in particular so as to be wireless-based, that is to say by way of Bluetooth, WLAN, etc., for example, the shut-position detection installation and/or the bite-detection installation for this reason comprising respective wireless-based broadcasting installations. An external mobile terminal apparatus can be a mobile phone, a smartphone, a tablet computer, a notebook computer, etc., for example.

With a view to the multiplicity of electrical and/or electronic components that are optionally to be disposed in the housing part, this is to say in particular respective controller or detection installations, it can be expedient for at least one receptacle chamber to be configured or disposed in the interior space in the housing part, in which electrical and/or electronic components of the device, in particular controller installations and detection installations, are disposable or are disposed. The receptacle chamber thus provides protection for these components in relation to external, that is to say in particular climatic and mechanical, influences. The receptacle chamber can be embodied so as to be integral to the housing part, or as a discrete component which is to be inserted separately into the interior space in the housing part. The receptacle chamber can be capable of being closed or be closed by way of a lid element, wherein the latter herein can also be the lid element on the housing part that has been mentioned above, such that potential access into the receptacle chamber can be achieved by removal of the lid element.

The or a receptacle chamber in which respective electrical and/or electronic components of the device, in particular controller installations and detection installation, are disposable or are disposed, can have an in particular cylindrical or cylinder-shaped, respectively, receptacle chamber main body that delimits a receptacle chamber volume for receiving electrical and/or electronic components of the device and at least in portions protrudes into a receptacle space in the housing part.

The receptacle chamber is expediently capable of being releasably fastenable to the housing part, or is releasable fastened to the latter. The receptacle chamber can thus be disposed on or in the housing part and be removed from the latter. Of course, the receptacle chamber main body protrudes into the receptacle space in the housing part only in that state of the receptacle chamber in which the latter is fastened to the housing part. The releasable fastening of the receptacle chamber on the housing part is capable of being configured or is configured by an in particular form-fitting interaction between at least one fastening portion on the housing part and at least one fastening portion on the receptacle chamber main body. Thus, the receptacle chamber and the housing part here are in each case equipped with at least one fastening portion, a stable or captive, respectively, but nevertheless releasable fastening of the receptacle chamber on the housing part being implementable by way of the interaction of said fastening portions. An in particular form-fitting interaction of respective fastening portions is understood to be in particular a mutual engagement of respective fastening portions in one another or across one another, at least in portions.

The receptacle chamber herein can be disposable or be disposed and supported on the housing part so as to be rotatable between a fastening position and a releasing position. In the fastening position, the at least one fastening portion on the housing part and the at least one fastening portion on the receptacle chamber main body interact in particular in a form-fitting manner such that the receptacle chamber is releasably fastened to the housing part. In the releasing position, the at least one fastening part on the housing part and the at least one fastening portion on the receptacle chamber main body do not interact such that the receptacle chamber is releasable from the housing part. The fastening of the receptacle chamber to the housing part can thus be established and cancelled again by rotating movements of the receptacle chamber relative to the housing part about a rotation axis which is typically congruent with the central axis of the receptacle chamber. The receptacle chamber can thus be transferred from the fastening position to the releasing position and vice versa by rotating movements relative to the housing part.

The or at least one fastening portion on the housing part can be configured as an annular disk element or annular disk segment element that radially protrudes from a cylindrical portion of the housing part, having at least one shoulder-type fastening protrusion that axially protrudes from said annular disk element. The or at least one fastening portion on the receptacle chamber main body can be configured as an annular disk element or annular disk segment element that radially protrudes from a cylindrical appendage of the receptacle chamber main body, having a corresponding axially protruding shoulder-type fastening protrusion, that is to say is in particular configured or aligned so as to be complementary, respectively, to the fastening protrusion that is formed on the fastening portion on the housing part.

In order for respective rotating movements of the receptacle chamber to be implemented, the receptacle chamber in the region of an upper exposed cover portion has at least one tool-engagement region for engaging a tool in a form-fitting manner, by way of which tool rotating movements can be transmitted to the receptacle chamber in order for the receptacle chamber to be transferred from the fastening position to the releasing position, and vice versa. By disposing or configuring, respectively, at least one respective tool-engagement region in the region of an upper exposed cover portion of the receptacle chamber, the tool-engagement region is at all times accessible (from above). The geometric design of the tool-engagement region is of such a type that a for example T-shaped tool can engage on the former in a form-fitting manner such that rotating movements can be transmitted to the receptacle chamber.

The tool-engagement region in the state of the device in which the latter is disposed in an orderly manner, that is to say inserted into a sewer shaft, for example, is readily accessible, that is to say in particular from above. By way of suitable shaping and dimensioning of a respective tool in relation to the example of a device that is disposed in a sewer shaft, for example, it is not mandatory for a user to climb down into the sewer shaft in order for the receptacle chamber to be transferred from the fastening position to the releasing position, or vice versa, by way of corresponding rotating movements. The receptacle chamber can thus be released from the housing part outside the sewer shaft and be optionally removed from the sewer shaft. This can be of practical value for example for checking purposes, for example as to whether lure-biting has occurred, such that checks can be carried out in a significantly simpler and more rapid manner. In particular when the or a lure is mounted by way of an optional lure-holding installation for mounting an additional lure that is disposed or configured on the receptacle chamber, the receptacle chamber together with the lure-holding installation and the lure mounted thereon can be removed from the sewer shaft, any lure-biting can be identified, and optionally a changeover or a replacement of the or a lure can be performed, and the receptacle chamber together with the lure-holding installation and any lure mounted thereon can be introduced back into the sewer shaft without having to climb into the latter.

It can be derived from the above paragraph that the or in general terms a lure-holding installation for mounting an additional lure is expediently disposed or configured on the receptacle chamber. The lure-holding installation herein is disposed or configured in particular on a portion of the receptacle chamber that protrudes into the receptacle space in the housing part.

Further advantages, features, and details of the invention are derived from the exemplary embodiment that will be described hereunder, and by means of the drawings. In the drawings:

FIGS. 1-6 show in each case an in-principle illustration of a device for mounting a lure according to one exemplary embodiment of the invention; and FIGS. 7-10 show in each case an in-principle illustration of a device for mounting a lure according to a further exemplary embodiment of the invention.

FIG. 1 shows an in-principle illustration of a device 1 for mounting a lure 2 according to one exemplary embodiment of the invention. The lure 2 contains substances, that is to say in particular toxins and active ingredients, which lead to pests such as, in particular, rats expiring and/or prevent pests reproducing. FIG. 1 obviously shows a sectional view of the device 1.

The device 1 comprises a housing part 3. The housing part 3 is configured from a corrosion-resistant material such as, for example, a steel sheet, and is configured so as to be (substantially) a hollow-cylindrical body, that is to say that the housing part 3 delimits a (substantially) cylindrical interior space 5.

The housing part 3 is inserted into a sewerage 4, that is to say into a waste water sewer or a waste water sewer shaft, respectively, in short a sewer shaft. The fastening of the housing part 3 is performed by fastening means (not shown in more detail) on the housing part, by way of which the housing part 3 is in particular releasably fastened to a wall of the sewerage 4. The fastening means can be configured so as to be hook-shaped such that the housing part 3 can be hooked into the wall of the sewerage 4 or into corresponding climbing installations (not shown) such as step irons, for example, on the sewerage.

An optional lid element 6 is provided in the region of an upper end side of the housing part 3. The housing part 3 at the end side is thus closable by way of a lid element 6. Potential upper access into an interior space 5 in the housing part can be achieved by removing the lid element 6. The lid element 6 has a threaded portion (not shown), while the housing part 3 has a threaded portion (likewise not shown) that is complementary to the former, such that the lid element can be screw-fitted to the housing part 3. An optional sealing element 7 which enables sealing of the housing part 3 in the region of the upper end side is furthermore disposed between the lid element 6 and the housing part 3. As mentioned, the lid element 6 is purely optional. To the extent that no lid element 6 is available, the upper end side of the housing part 3 can be closed off by a respective wall element at the end side on the housing part.

The housing part 3 in the region of a lower end side that is opposite the upper end side has a typically circular axial through opening 9. The through opening 9 establishes potential access into the interior space 5 in the housing part. The through opening 9 thus defines an upper region 5a of the interior space 5 that is above said through opening 9, and a lower region 5b of the interior space 5 that is below said through opening 9.

The through opening 9, is delimited by wall elements 11, in particular by the free ends of the latter, that in relation to the axis of symmetry of the housing part 3 run radially inward. The wall elements 11 in relation to the axis of symmetry of the housing part 3 protrude radially inward from the external wall 10 of the housing part 3. Those regions of the wall elements 11 that face the upper end side of the housing part 3 form an annular platform 8.

The device 1 furthermore comprises a closing body 15. The closing body 15 is a rotationally symmetrical component, comprising as construction elements or construction element portions, respectively, that belong to the former a main body 15a, a connection web 15b that in relation to the axis of symmetry of the main body 15a is axially protruding, and a plate-shaped support portion 15c that is disposed at the free end of the connection web 15b and in relation to the axis of symmetry of the main body 15a extends radially. The support portion 15c is thus connected to the main body 15a by way of the connection web 15b. This connection can be releasable, that is to say that both the main body 15a as well as the support portion 15c can be releasably connected to the connection web 15b by way of clamping, latching, or plug-fitting connections. Of course, it is also conceivable for the closing body 15 to be configured in an integral or monolithic manner, respectively.

As can be seen, a lure-receiving region 15d that is formed by a depression that in portions is annular is formed in the main body 15a. The lure-receiving region 15d in terms of the dimensions thereof is adapted to the dimensions of the lure 2 that here is likewise annular, such that said lure 2 is received in a stable manner in the lure-receiving region 15d.

The connection of the closing body 15 to the housing part 3 is performed in that the free ends of the support portion 15c are inserted into the interior space 5 in the housing part in such a manner that said free ends at the upper side engage across the wall elements 11 on the housing part and thus bear on said wall elements 11 in the open position of the closing body 15. This results in a captive but, as will yet be derived hereunder, releasable arrangement of the closing body 15 on the housing part 3, or a releasable connection between the closing body 15 and the housing part 3, respectively.

As can be seen, the support portion 15c on the closing body, in terms of the (radial) dimensions thereof, is dimensioned in such a manner that said support portion 15c is movable through the through opening 9 in the housing part by tilting movements of the closing body 15 relative the housing part 3. The external diameter, or the radial dimensions, respectively, of the support portion 15c is/are thus smaller than the internal diameter of the housing part 3. In order for the support portion 15c to be moved through the through opening 9 in the housing part, the support portion 15c initially has to be lifted or moved by a specific amount further into the interior space 5 in the housing part, and then tilted relative to the housing part 3. In this manner, the connection between the housing part 3 and the closing body 15 can be cancelled on demand and, in the case of the reverse sequence, be (re)established.

It can be derived from the explanations above that the closing body 15 is supported so as to be movable relative to the housing part 3. An open position and a shut position are provided in the context of the movable support of the closing body 15. The closing body 15 is thus supported so as to be movable relative to the housing part 3 in particular between an open position and a shut position, and can be moved between an open position and a shut position, and optionally vice versa.

In the open position shown in FIG. 1, the main body 15a of the closing body 15 is moved away from the housing part 3 in such a manner that the through opening 9 is exposed. In the shut position shown in FIG. 2, the main body 15a of the closing body 15 is moved against the housing part 3, that is to say against the lower portions of the wall elements 11 on the housing part that face the lower end side of the housing part 3, in such a manner that the through opening 9 is closed off. In the shut position of the closing body 15, the lure 2 that is received in the lure-receiving region 15d is thus enclosed between the main body 15a and the housing part 3. In the shut position of the closing body 15, the lure 2 that is received in the lure receiving region 15d is in particular disposed within the interior space 5 in the housing part, that is to say in particular within the lower region 5b of the interior space 5 in the housing part.

In the shut position of the closing body 15, bearing of closing portions 16 on the closing body in a sealing manner on respective lower portions of the wall elements 11 on the housing part, which are to be considered to be bearing portions 17 on the housing part, is provided. Bearing in a sealing manner results from the bearing portions 17 on the housing part being provided with a sealing element 19. A sealing element can optionally also be available on the closing portions 16 on the closing body.

The closure of the through opening 9 that is implemented in the shut position of the closing body 15 prevents undesirable ingress of water into the upper region 5a of the interior space 5 in the housing part, this being possible in the case of high water or gushing water, for example. As has been mentioned, since the lure 2 that is received in the lure-receiving region 15d in the shut position of the closing body 15 is enclosed between the main body 15a of the closing body 15 and the housing part 3, the risk of any contamination of the water that is located in the sewer shaft by the substances that are contained in the lure 2 is eliminated.

Figure 2:
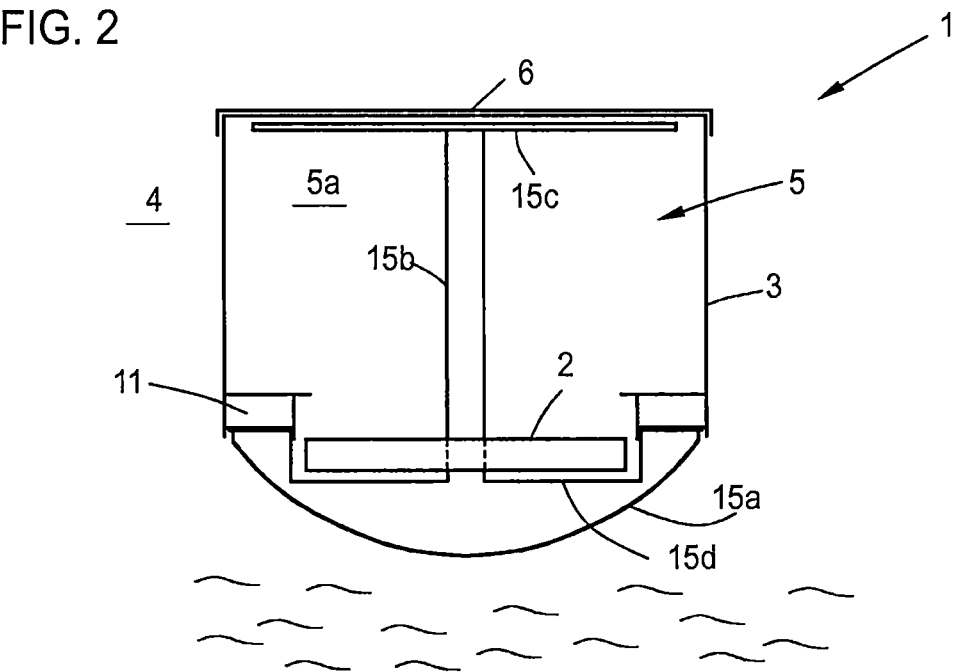

The movement of the closing body 15 from the open position to the shut position in the case of the exemplary embodiment shown in FIGS. 1, 2 is performed by a rise in the water level in the sewer shaft. This relates to the main body 15a of the closing body 15 being configured as a float. The main body 15a of the closing body 15 thus has a cavity (not shown) that is filled with air, for example. Alternatively or additionally, the main body 15a of the closing body 15 can be made from an in particular foamed plastic material of low density, which by virtue of the density differential floats on a water surface and does not sink. A movement of the closing body 15 from the open position to the shut position is thus automatically initiated by a rise in the water level in the sewer shaft. Accordingly, a movement of the closing body 15 from the shut position to the open position is initiated by a drop in the water level in the sewer shaft.

The closing body 15 can be supported so as to be movable in a reversible or irreversible manner. The movement of the closing body 15, as described, from the open position to the shut position can thus be reversible or irreversible. A support of the closing body 15 that is reversibly movable means that the closing body 15 can transfer from the open position to the shut position in a self-acting manner. A support that is irreversibly movable means that the closing body 15 in the shut position by way of a closing-body holding installation (not shown) is capable of being in particularly releasably mounted or is mounted, and can thus cannot transfer from the shut position to the open position in a self-acting manner. A respective closing body holding installation typically comprises at least one mechanical and/or magnetic holding means on the housing part and/or on the closing body, which holding means is adapted for mechanically and/or magnetically mounting the closing body 15 in the shut position. The mechanical and/or magnetic holding means on the housing part and/or on the closing body can thus interact in such a manner that the closing body 15 is securely mounted in the shut position and is not capable of being readily released from the latter.

Figure 3:
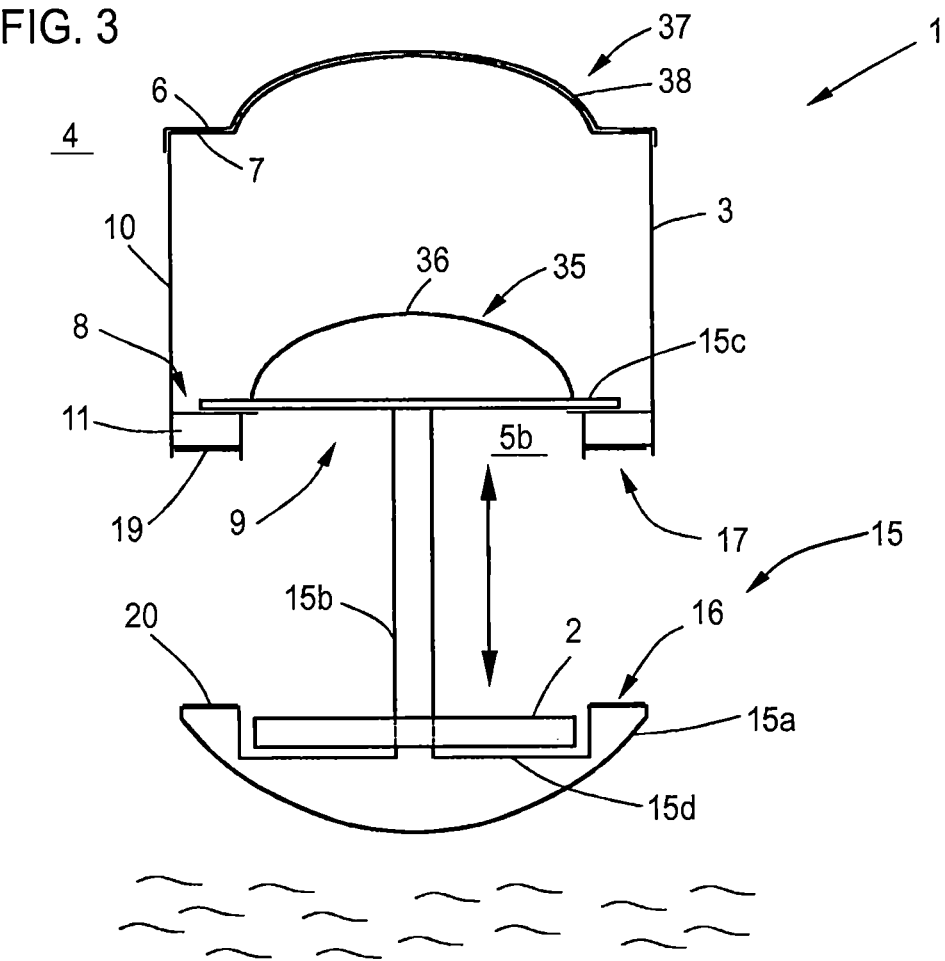
Figure 4:
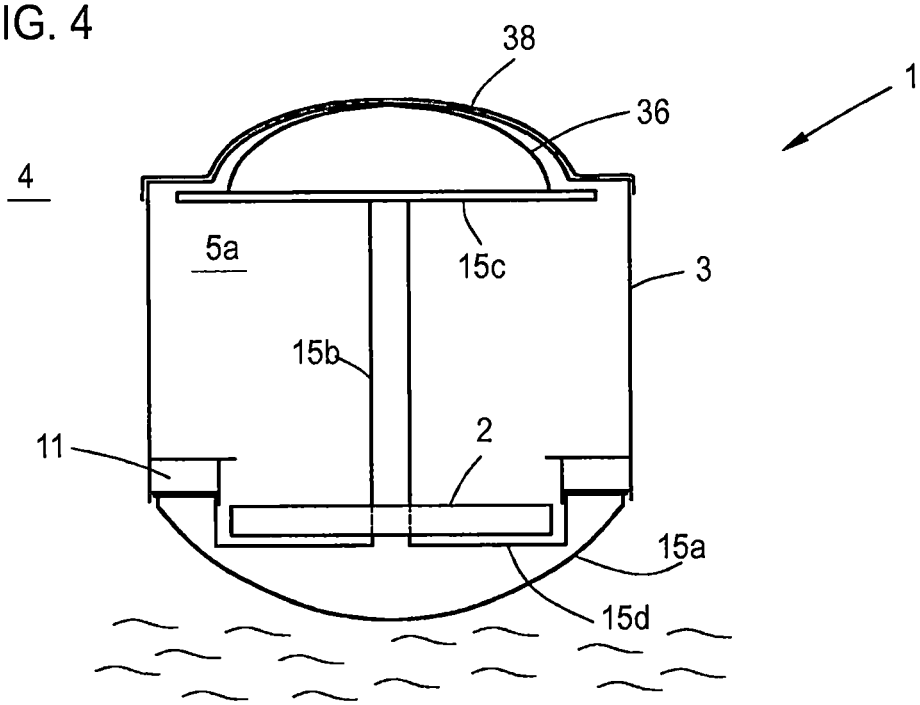

FIG. 3 shows a device 1 according to a further exemplary embodiment of the invention. FIG. 3 herein shows the device 1 having a closing body 15 that is located in the open position. FIG. 4 shows the same exemplary embodiment having the closing body 15 located in the shut position. These again are sectional views of the device 1.

By contrast to the exemplary embodiments as shown in FIGS. 1, 2, the support portion 15c on the closing body at the upper side is provided with a securing contour 35, here in the form of an axially protruding dome-shaped protrusion 36. Accordingly, the housing part 3 in the region of the upper end side thereof is provided with a counter-securing contour 37, here in the form of a dome-shaped convexity 38, that is complementary to the securing contour 35. The counter-securing contour 37 can be integrated in a respective lid element 6, if the latter is available.

The securing contour 35 on the support portion and the counter-securing contour 37 on the housing part are in mutual axial alignment. Accordingly, the securing contour 35 on the support portion in the shut position of the closing body 15 engages in the counter-securing contour 37 on the housing part. The securing contour 35 on the support portion and the counter-securing contour on the housing part in the shut position of the closing body 15 thus interact in such a manner that the closing body 15 is supported so as to be secured against displacement movements that are radial in relation to the central axis of the housing part 3 (cf. FIG. 4).

Figure 5:
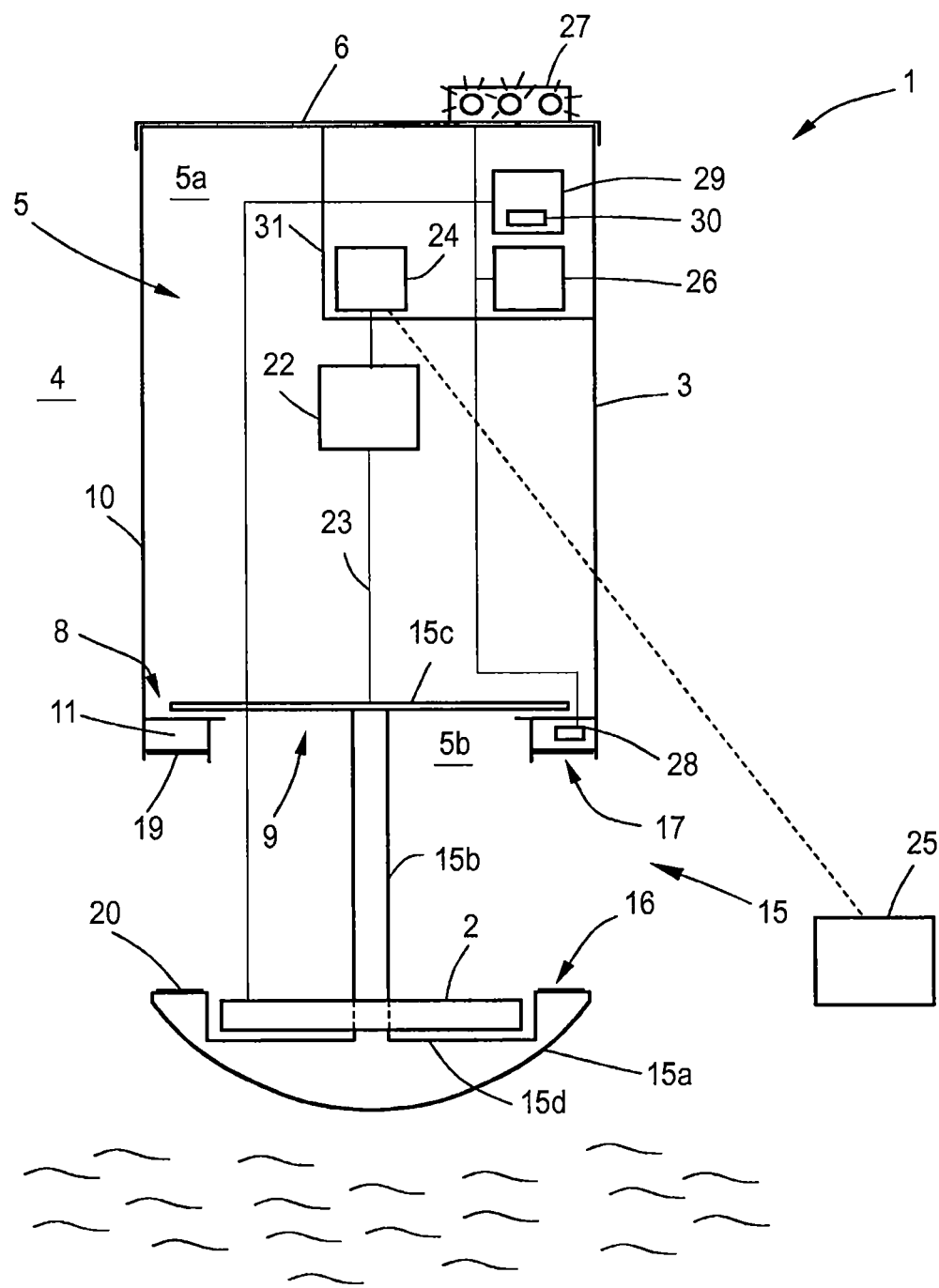

FIG. 5 shows a device 1 according to a further exemplary embodiment of the invention. By contrast to the exemplary embodiments as shown in FIGS. 1 to 4, the device 1 here comprises a motorized drive installation 22 in the form of an electric motor that is coupled to the closing body 15 and is adapted for moving the closing body 15 from the open position to the shut position, or vice versa. A movement of the closing body 15 from the open position to the shut position here can thus be initiated in a targeted manner by a motorized drive installation 22 that is coupled to the closing body 15. The coupling between the motorized drive installation 22 and the closing body 15 is implemented by way of a traction means 23, for example in the form of a chain. The traction means 23 engages on the support portion 15*c* on the closing body. Of course, the main body 15*a* of the closing body 15 can also be configured as a float in this exemplary embodiment.

Controlling of the operation of the motorized drive installation 22 is performed by way of a controller installation 24 that is assigned to said motorized drive installation 22 and is adapted for generating items of control information that control the operation of the motorized drive installation 22.

The controller installation 24 is furthermore adapted for generating the items of control information depending on an item of water-level information that describes the or a water level in the sewer shaft and is supplied by a water-level detection installation 25 for detecting the water level in the sewer shaft that receives the device 1. Consequently, controlling of the operation of the motorized drive installation 22 can be performed so as to depend on a water level in the sewer duct that receives the device 1, that is detected by way of a respective water-level detection installation 25 and is mirrored in a respective item of water-level information.

In the exemplary embodiment shown in FIG. 5 the water-level detection installation 25 is disposed so as to be external, this is to say so as to be spatially separated from the device 1. The controller installation 24 is adapted for communicating in a wireless-based manner with the (external) water-level detection installation 25, for example. To this end, the controller installation 24 comprises a suitable receiver installation (not shown), and the water-level detection installation 25 comprises a suitable broadcasting installation (not shown). However, in principle, the or a respective water-level detection installation 25 can also be integrated in the device 1.

Figure 6:
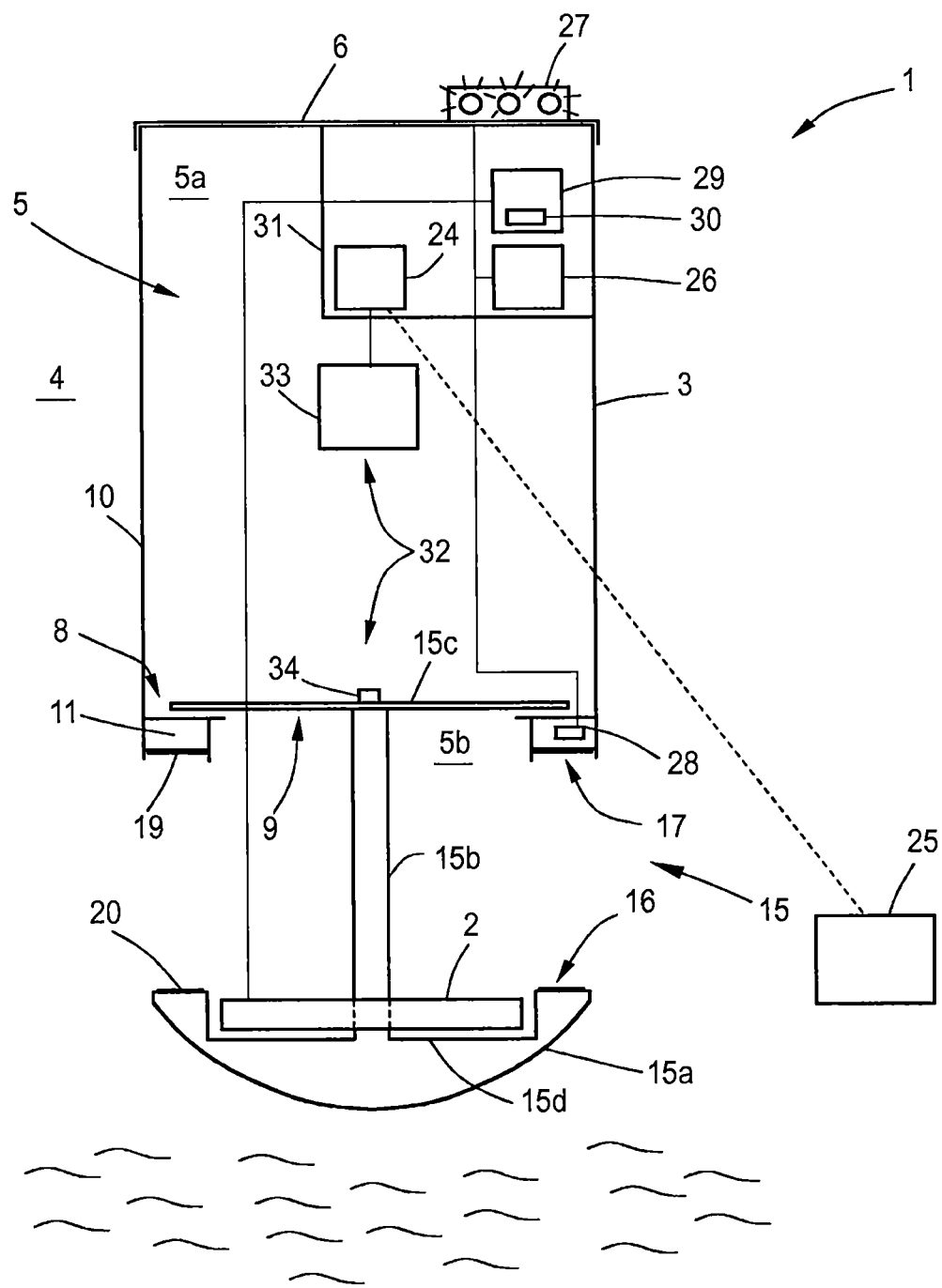

FIG. 6 shows a device 1 according to a further exemplary embodiment of the invention. By contrast to the exemplary embodiment as shown in FIG. 5, not a motorized drive installation 22 but a magnetic drive installation 32 is provided here. The magnetic drive installation 32 comprises an electromagnetic element 33 that is disposed in the upper region 5*a* of the interior space 5, and a permanently magnetic element 34 that is disposed on the closing body, that is to say here on the support portion. The permanently magnetic element 33 on the housing part, when energized, exerts a magnetic force of attraction on the permanently magnetic element 34 on the closing body of such magnitude that the closing body 15 is moved from the open position to the shut position. The operation of the electromagnetic element 33, that is to say in particular energizing of the latter, is likewise controlled by way of the controller installation 24. The explanations made in the context of controlling the operation of the motorized drive installation 22 apply in an analogous manner hereto.

As an alternative to the configuration having respective electromagnetic elements 33 and permanently magnetic elements 34, respectively, as shown in the exemplary embodiment shown in FIG. 6, it is also possible for permanently magnetic elements 34 on the housing part and electromagnetic elements 33 on the closing body to be provided. It is also conceivable for electromagnetic or permanently magnetic elements 33, 34 to be provided both on the housing part as well as on the closing body.

As shown for reasons of improved clarity only in the exemplary embodiments as shown in FIGS. 5, 6, the device 1 can furthermore comprise a shut-position detection installation 26 for detecting the shut position of the closing body 15. The shut-position detection installation 26 upon detection of the shut position of the closing body 15 is adapted for generating at least one of an acoustic and/or optical item of shut-position information, and for outputting the latter by way of an output means 27 which can be a loudspeaker, for example, and/or an in particular multi-colored LED. The shut-position detection installation 26 comprises a sensor system 28 for detecting the shut position of the closing body 15. The sensor system 28 that here is integrated in the bearing portions 17 on the housing part and is configured or adapted, respectively, as a pressure sensor system, detects bearing of the closing portions 16 on the closing body on the bearing portions 17 on the housing part.

As again shown for the sake of improved clarity only in the exemplary embodiments as shown in FIGS. 5, 6, the device 1 can also comprise a bite-detection installation 29 for detecting lure-biting. The bite-detection installation 29 upon detection of a bitten lure 2 is adapted for generating at least one of an acoustic and/or optical item of biting information and for outputting the latter by way of the output means 27. Consequently, the bite-detection installation 29 comprises a sensor system 30 for detecting lure-biting. The sensor system 30 can detect the weight of the lure 2, for example, wherein variations in the weight of the lure 2 due to biting can permit conclusions to be drawn in terms of lure-biting. The sensor system 30 can likewise detect forces that act on the lure 2 due to biting, in particular tensile forces, which likewise permit conclusions to be drawn in terms of lure-biting.

The bite-detection installation 29, depending on the biting information, can generate different acoustic and/or optical signals. With a view to outputting respective items of biting information in the form of optical signals it is conceivable for the weight of a new not bitten lure 2 to be potentially signaled by way of optical signals of green color and/or by way of optical signals that are permanently and constantly output, for example. The weight of a partially bitten lure 2 can be signaled by way of optical signals of yellow color and/or by way of optical signals that are output at a first flashing frequency, for example. Should the lure 2 be completely devoured, this can be signaled by way of optical signals of red color and/or by way of optical signals that in comparison to the first flashing frequency are output at a higher second flashing frequency, for example. Of course, the same applies to the output of acoustic signals, wherein the frequency and/or the rhythm of a tone or of a sequence of tones, respectively, are/is in particular variable so as to depend on the weight of the lure 2 or on the forces that act on the lure 2, respectively.

As opposed to the arrangement of the output means 27 on the housing part 3 as shown in the exemplary embodiments shown in the figures, it is also possible for the or an output means 27 to be integrated in an external mobile terminal apparatus (not shown) such as a smartphone, for example. In this case, the shut-position detection installation 26 and/or the bite-detection installation 29 are/is adapted for communication with the external mobile terminal apparatus and for transmitting the shut-position information and/or the bite-information to the external mobile terminal apparatus for output by the output means of the latter. The communication is implemented in particular so as to be wireless-based, that is to say by way of Bluetooth, WLAN, etc., for example, the shut-position detection installation 26 and/or the bite-detection installation 29 for this reason comprising respective wireless-based broadcasting installations.

As can be seen, an optional receptacle chamber 31 in which electrical and/or electronic components of the device 1, that is to say in particular the controller installation 24 and respective detection installations 26, 29 and optionally installations for supplying the latter with electrical power, such as electric power accumulators, for example, are disposed is configured in the interior space 5 in the housing part. The receptacle chamber 31 offers these components protection against external, that is to say in particular climatic and mechanical influences.

Figure 7:
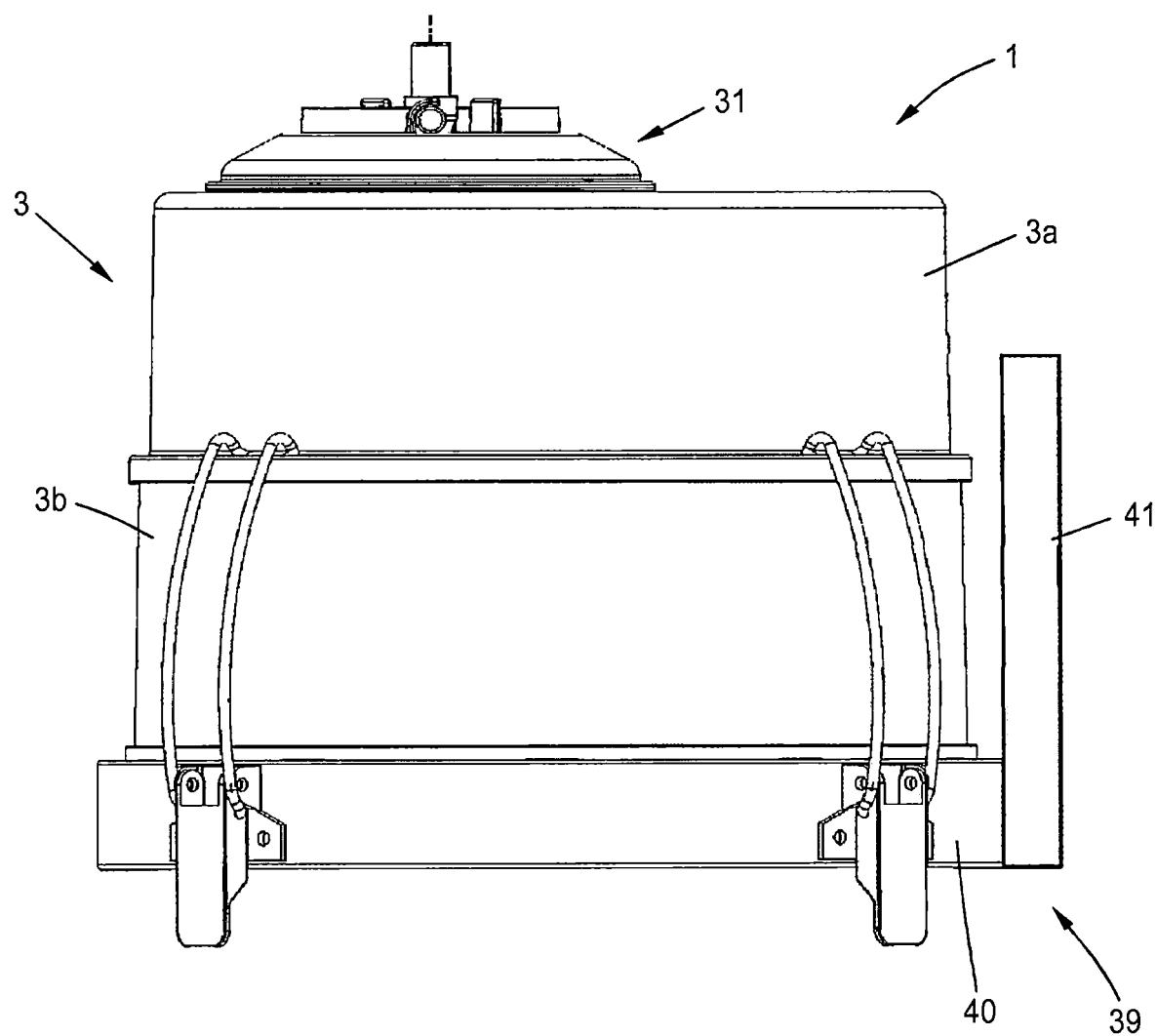
Figure 8:
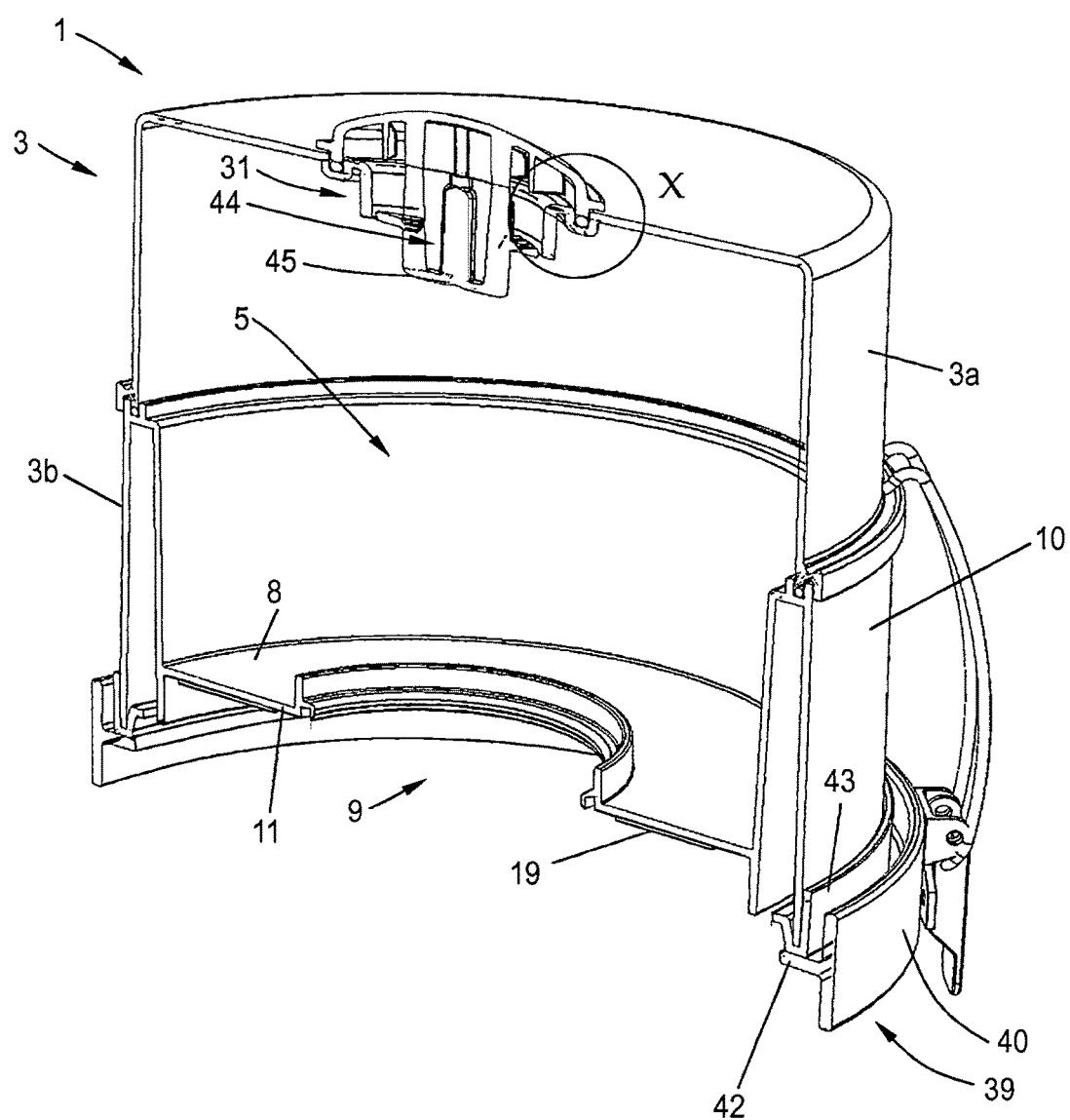
Figure 9:
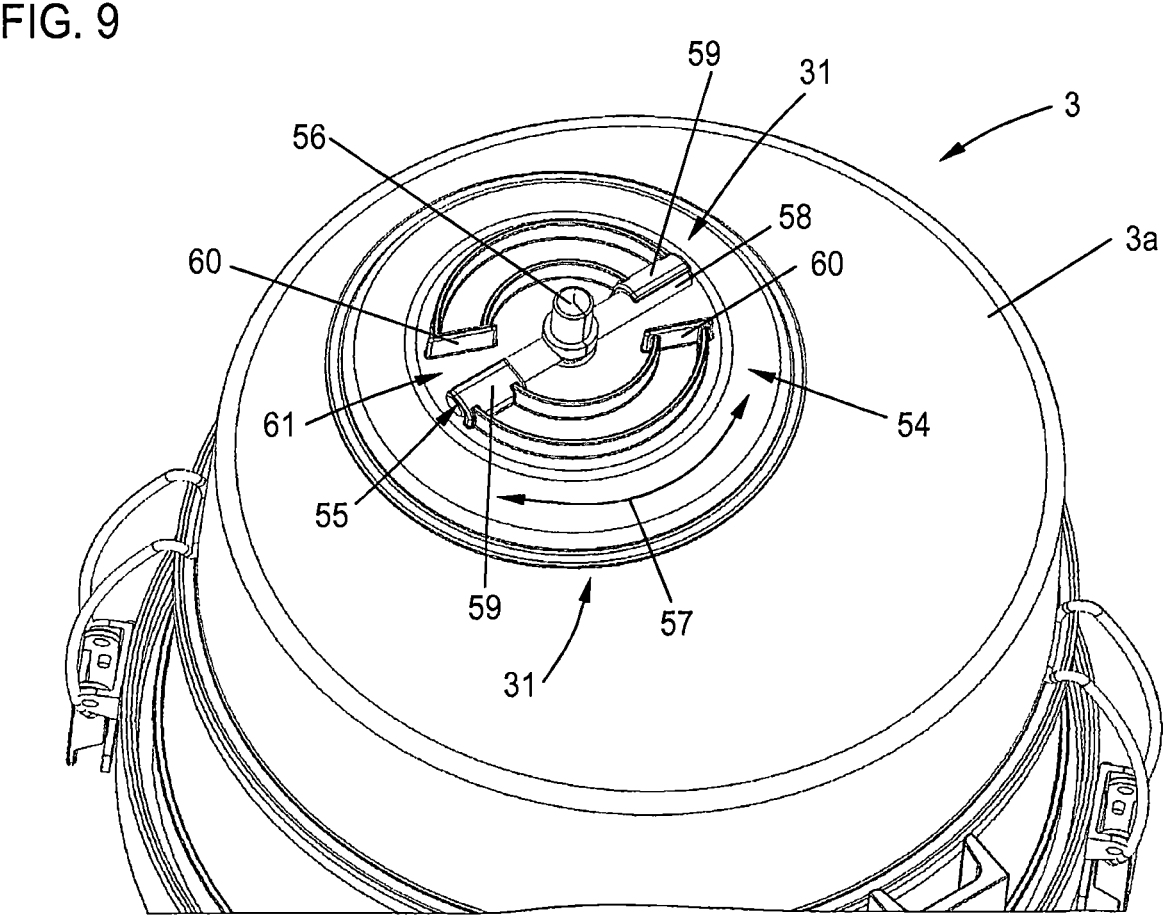
Figure 10:
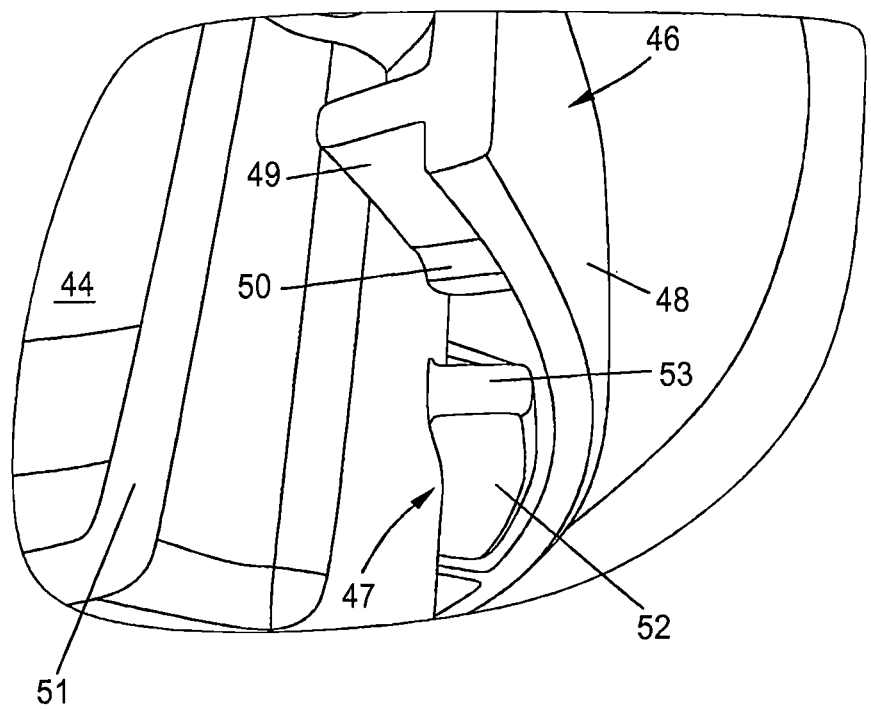

FIGS. 7 to 10 show in each case an in-principle illustration of a device 1 for mounting a lure 2 according to a further exemplary embodiment of the invention. As can be seen, FIG. 7 is a perspective partial view of the device 1 without the closing body 15; FIG. 8 is a longitudinal section through the device 1 as shown in FIG. 7; FIG. 9 is a plan view of the device 1; and FIG. 10 is an enlarged view of the detail X shown in FIG. 8.

The closing body 15 is therefore not shown in FIGS. 7 to 10, since technical aspects of the device 1 in particular in the context of a particular embodiment of a receptacle chamber 31 are to be visualized by means of these figures.

As can be derived from the exemplary embodiment shown in FIGS. 7 to 10, the housing part 3 that belongs to the device 1 can also be embodied in multiple parts. The housing part 3 here is embodied from an upper housing-part segment 3a and from a lower housing-part segment 3b. The housing-part segments 3a, 3b here are mutually fastened by way of holding clamps (not referred to in more detail here). Of course, other fastening principles for the mutual fastening of the housing-part segments 3a, 3b are also possible.

Moreover, a fastening installation 39 on the housing part, by way of which the housing part 3 is capable of being in particular releasably fastened or is fastened to a wall of the sewerage 4 is disposed on the external circumference of the lower housing-part segment 3b in the region of that end that faces away from the upper housing-part segment 3a.

The fastening installation 39 here comprises an external annular element 40 that is formed from steel, for example. The annular element 40 by way of a profile-type mounting 41, shown in FIG. 7, can be fastened to the wall of a sewer shaft. A holding web 42 in the shape of an annular disk emanates from the annular element 40 in the radial direction. The holding web 42 supports an optional securing element 43 that is fastened to the external wall 10 of the housing part 3, that is to say to the external wall 10 of the lower housing-part segment 3b. The securing element 43 that is likewise embodied in an annular manner here is fastened to the housing part 3, that is to say to the external wall 10 on the housing part, by means of a latching mechanism. The latching mechanism is implemented by the interaction of latching elements in the form of latching protrusions (not shown in more detail here) on the external housing wall and of counter-latching elements in the form of latching clearances (not shown in more detail here) on the securing element, the latching elements on the external housing wall being able to latch into said counter-latching elements. Of course, a reversed arrangement, that is to say latching elements in the form of latching clearances on the external housing wall and latching elements in the form of latching protrusions on the securing element, is also conceivable.

A cylindrical receptacle chamber 31 is disposed in that region that forms an upper side or end side, respectively, of the housing part 3, that is to say of the upper housing-part segment 3a. The receptacle chamber 31 has a cylindrical receptacle chamber main body 45 that delimits a receptacle chamber volume 44 for receiving electrical and/or electronic components of the device 1. As can be seen, the receptacle chamber main body 45 in portions protrudes into the receptacle space 5 in the housing part.

A lure-holding installation (not shown) for mounting a further lure 2 can be disposed on a lower portion of the receptacle chamber main body 45 that protrudes into the receptacle space 5 in the housing part.

The receptacle chamber 31 is releasably fastenable to the housing part 3, that is to say to the upper housing part 3a, here. The releasable fastening of the receptacle chamber 31 to the housing part 3 is capable of being configured or is configured by a form-fitting interaction of fastening portions 46 on the housing part with fastening portions 47 on the receptacle chamber main body. The receptacle chamber 31 and the housing part 3 are thus each equipped with fastening portions 46, 47, a stable or captive, respectively, but releasable fastening of the receptacle chamber 31 to the housing part 3 being implementable by way of the interaction of said fastening portions 46, 47. As can be derived in particular from FIG. 10, a form-fitting interaction of respective fastening portions 46, 47 is understood to be in particular a mutual engagement of respective fastening portions 46, 47 in one another or across one another, at least in portions.

The receptacle chamber 31 is disposed on the housing part 3 so as to be supported in a rotatable manner between a fastening position and a releasing position. In the fastening position, the fastening portions 46 on the housing part and the fastening portions 47 on the receptacle chamber main body interact in a form-fitting manner such that the receptacle chamber 31 is releasably fastened to the housing part 3. In the releasing position, the fastening portions 46 on the housing part and the fastening positions 47 on the receptacle chamber main body do not interact, such that the receptacle chamber 31 is releasable from the housing part 3. The fastening of the receptacle chamber 31 to the housing part 3 can thus be established and cancelled again by rotating movements of the receptacle chamber 31 relative to the housing part 3 about a rotation axis which is typically congruent with the central axis of the receptacle chamber 31. The receptacle chamber 31 can thus be transferred from the fastening position to the releasing position and vice versa by rotating movements relative to the housing part 3.

As can be derived from FIG. 10, the fastening portions 46 on the housing part are configured as an annular disk segment element 49 that radially protrudes inward from an axially aligned cylindrical portion 48 of the housing part 3, having at least one shoulder-type fastening protrusion 50 that axially protrudes from said annular disk segment element 49. The fastening portions 47 on the receptacle chamber main body are configured as an annular disk segment element 52 that radially protrudes outward from a cylindrical appendage of the receptacle chamber main body 45, having a corresponding axially protruding shoulder-type fastening protrusion 53, that is to say is in particular configured or aligned so as to be complementary, respectively, to the fastening protrusion 50 that is formed on the fastening portion 46 on the housing part.

In order for respective rotating movements of the receptacle chamber 31 relative to the housing part 3 to be implemented, the receptacle chamber 31 in the region of an upper exposed cover portion 54, shown in FIG. 9, has a tool-engagement region 55 in which a presently T-shaped tool 56 having an engagement portion 58 can engage in a form-fitting manner. By way of the tool 56 that engages in the tool-engagement region 55, as shown in FIG. 9, the rotating movements can be transmitted to the receptacle chamber 31 in order for the receptacle chamber 31 to be transferred from the fastening position to the releasing position and vice versa. As can be seen, the tool-engagement region 55 here is configured having tool receptacles 59 in the shape of annular segments here, in which the engagement portion 58 on the tool, that is designed with a rounded cross section, can engage such that counter-clockwise rotating movements of the tool 56 lead to counter-clockwise movements of the receptacle chamber 31.

A detent portion 60 is configured so as to be disposed opposite the engagement portion 58 in terms of the circumference of the latter. A gap space 61 that extends on the circumference and by way of which the tool 56 can be introduced into the tool-engagement region 55, so as to interact with the latter in a corresponding manner, is formed between the engagement portion 59 and the detent portion 60.

By disposing or configuring, respectively, the tool-engagement region 55 in the region of an upper exposed cover portion 54 of the receptacle chamber 31, the tool-engagement region 55 is at all times accessible (from above). The geometric design of the tool-engagement region 55 is adapted to the design of the tool 56. The geometric design of the tool-engagement region 55 is presently of such a type that a T-shaped tool 56 can engage on the former in a form-fitting manner such that by way of rotating movements of the tool 56 that are indicated by the double arrow 57, rotating movements can be transmitted to the receptacle chamber 31.

Accordingly the tool-engagement region 55 in a state in which the device 1 is inserted in an orderly manner into a sewer shaft is readily accessible, that is to say in particular from above. By way of suitable shaping and dimensioning of a respective tool 56 it is not mandatory for a user to climb down into the sewer shaft in order for the receptacle chamber 31 to be transferred from the fastening position to the releasing position, or vice versa, by way of corresponding rotating movements. The receptacle chamber 31 can thus be released from the housing part 3 from outside the sewer shaft and be optionally removed from the sewer shaft. This can be of practical value for example for checking purposes, for example as to whether lure-biting has occurred, such that checks can be carried out in a significantly simpler and more rapid manner. The receptacle chamber 31 can thus be removed from the sewer shaft and be introduced into the sewer shaft again without climbing into the sewer shaft.

Notwithstanding the housing part 3 in the exemplary embodiments as shown in the figures being inserted into a sewerage 4, that is to say into a waste-water sewer or a waste-water sewer shaft, respectively, in short a sewer shaft, it is generally possible for the housing part 3 to be disposed on or in an environment in which the latter can come into contact with water, in particular rain water, but also industrial waste water, combined water, surface water, etc. and/or other liquid media. In principle, the housing part 3 is disposable or is disposed in such locations where the possibility of a contamination of water and/or other liquid media by the substances that are contained in the lure 2 is conceivable. This applies in particular to locations where water or liquid media are present in principle, or where water or liquid media, respectively, can accumulate.

The housing part 3 can thus be disposable or be disposed at or in specific structures or parts of structures, respectively, or buildings or parts of buildings, respectively, in civil engineering sectors above and below ground such as, for example, overpasses or underpasses, garages, basements, tank farms, silos, etc. Of course, the housing part 3 can also be disposable or be disposed at any other dispositions which can come into contact with water, in particular rain water, such as, for example, waste containers, cultivation projects, that is to say trees, for example, stockades, in particular walls or fences, stops for public or private transportation means, phone boxes, street lighting, distribution or utility boxes, respectively.

The device 1 or the housing part 3, respectively, can also be disposable or be disposed on or in transportation or transit means, respectively, such as ships, for example.

We claim:

1. A device for holding a lure for rodents comprising
   a housing part comprising walls defining an interior space, wherein the housing part has at least one through opening through which access to the interior space is possible,
   at least one float body having buoyancy and comprising at least one lure-receiving region for receiving a lure, said at least one lure-receiving region provided in or on the at least one float body;
   wherein the at least one float body is movable relative to the housing part in a first position in which the at least one float body is moved away from the at least one through opening in such a manner that the at least one through opening is exposed, and in a second position in which the at least one float body is moved relative to the at least one through opening in such a manner that the at least one through opening is closed off; wherein the at least one float body is guided via the walls of the housing part while moving between the first position and the second position; wherein
   the at least one float body is at least partially disposed within the housing part both in the first position and in the second position.

2. The device as claimed in claim 1, wherein the at least one float body is supported so as to be reversibly movable between the first position and the second position, or in that the at least one float body is supported so as to be irreversibly movable between the first position and the second position in such a manner that said at least one float body in the second position is capable of being mounted, or is mounted by way of at least one float body holding installation.

3. The device as claimed in claim 2, wherein the at least one float body holding installation comprises at least one mechanical and/or magnetic holding means which is adapted for mechanically and/or magnetically mounting the at least one float body to the housing part when the at least one float body is in the second position.

4. The device as claimed in claim 1, further comprising at least one drive installation that is capable of being coupled or is coupled to the at least one float body and is adapted for moving the at least one float body from the first position to the second position and/or vice versa.

5. The device as claimed in claim 4, wherein the at least one drive installation is configured as a motorized drive installation.

6. The device as claimed in claim 4, wherein the at least one drive installation is configured as a magnetic drive installation.

7. The device as claimed in claim 6, wherein the magnetic drive installation is on the housing part and on the at least one float body comprises at least one magnetic element.

8. The device as claimed in claim 4, further comprising a controller installation that is for generating items of control information that control operation of the at least one drive installation is assigned to the at least one drive installation, wherein the controller installation is adapted for generating items of control information depending on an item of water-level information that describes a water level in an environment that receives the device and is supplied by a water-level detection installation for detecting the water level in the environment that receives the device.

9. The device as claimed in claim 1, further comprising a shut-position detection installation for detecting the second position of the at least one float body that upon detection of the second position of the at least one float body is adapted for generating at least one of an acoustic and/or optical item of shut-position information and for outputting the at least one of an acoustic and/or optical item of shut-position information by way of at least one output means.

10. The device as claimed in claim 9, wherein the at least one output means is disposed on or in the housing part, wherein the at least one output means is disposed on an exposed external face of the housing part or within the interior space in the housing part.

11. The device as claimed in claim 9, wherein the at least one output means is integrated in an external mobile terminal apparatus, wherein the shut-position detection installation is adapted for communicating with the external mobile terminal apparatus and for transmitting the shut-position information to the external mobile terminal apparatus for output by the output means.

12. The device as claimed in claim 1, further comprising at least one bite-detection installation for the detection of lure-biting, wherein the at least one bite-detection installation upon detection of a bitten lure is adapted for generating at least one of an acoustic and/or optical item of bite information and for outputting the at least one of an acoustic and/or optical item of bite information by way of at least one output means.

13. The device as claimed in claim 1, wherein the at least one lure-receiving region is formed by at least one depressed portion of a main body of the at least one float body.

14. The device as claimed in claim 1, wherein a main body of the at least one float body has at least one float portion which in the second position of the at least one float body bears in a sealing manner on bearing portions on the housing part.

15. The device as claimed in claim 1, wherein the at least one float body comprises a main body and a support portion for supporting the at least one float body on the housing part, said support portion being spaced apart from said main body and connected thereto by way of at least one connection web.

16. The device as claimed in claim 15, wherein the support portion is dimensioned such that, by way of tilting movements of the at least one float body relative to the housing part, it is movable through the at least one through opening in the housing part.

17. The device as claimed in claim 15, wherein the support portion is provided with at least one securing contour, and the housing part is provided with at least one counter-securing contour that is configured so as to be complementary to said at least one securing contour, wherein the at least one securing contour and the at least one counter-securing contour in the second position of the at least one float body interact in counter-securing contour in the position of the at least one float body interact in such a manner that the float body is securely supported in relation to radial displacement movements relative a central axis of the housing part.

18. The device as claimed in claim 17, wherein the at least one, securing contour on the support portion is formed by a protrusion that in relation to the central axis of the at least one float body protrudes axially from the support portion, and the at least one, counter-securing contour on the housing part is formed by a dome-shaped or wedge-shaped convexity or clearance, or the at least one securing contour on the support portion is formed by a dome-shaped or wedge-shaped convexity or clearance, and the at least one counter-securing contour on the housing part is formed by a protrusion that in relation to the central axis of the housing part protrudes axially from the housing part.

19. The device as claimed in claim 1, wherein at least one receptacle chamber is configured or disposed in the interior space in the housing part, electrical and/or electronic components of the device being disposable or disposed in said at least one receptacle chamber.

* * * * *